United States Patent [19]

Sangregory et al.

[11] Patent Number: 5,296,885
[45] Date of Patent: Mar. 22, 1994

[54] APERTURE CORRECTION FOR MOVING APERTURE SHUTTERS

[75] Inventors: Jude A. Sangregory, Spencerport; Stephen G. M. Desormeaux, Rochester, both of N.Y.

[73] Assignee: Eastman Kodak Company, Rochester, N.Y.

[21] Appl. No.: 865,915

[22] Filed: Apr. 9, 1992

[51] Int. Cl.$^5$ .............................. G03B 9/08; G03B 9/02
[52] U.S. Cl. ....................................... 354/230; 354/270
[58] Field of Search ....................... 354/270, 271.1, 272, 354/274, 229, 230, 231

[56] References Cited

U.S. PATENT DOCUMENTS

| | | | |
|---|---|---|---|
| 1,663,326 | 3/1928 | Wollensak | 354/230 |
| 2,584,912 | 2/1952 | Palmer | 354/229 X |
| 2,956,491 | 10/1960 | Fischer et al. | 354/454 |
| 2,969,007 | 1/1961 | Groger | 354/230 |
| 3,033,093 | 5/1962 | Stimson et al. | 354/454 |
| 3,033,094 | 5/1962 | Stimson et al. | 354/454 |
| 4,209,243 | 6/1980 | Johnson et al. | 354/230 X |

FOREIGN PATENT DOCUMENTS 4-139427  5/1992  Japan .................... 354/229

Primary Examiner—Michael L. Gellner
Assistant Examiner—Jae N. Noh
Attorney, Agent, or Firm—Hodgson, Russ, Andrews, Woods & Goodyear

[57] ABSTRACT

Aperture correction for a moving aperture shutter comprising a first aperture, a second larger aperture, and a mechanism for causing relative movement between the first and second apertures between an initial position where the first and second apertures are out of registry, through an intermediate position where the first aperture is partially within the second aperture and an exposure position where the first aperture is within the second aperture, and wherein the aperture correction is provided by altering a physical relationship between the first and second apertures so as to minimize the amount of exposure of the second aperture during movement through the intermediate position. The shape and/or size of the second aperture can be altered, the location of the first aperture within the second aperture in the exposure position can be altered, or there can be a combined alteration of aperture shape, size and location. As a result, the foregoing counters the blur circle elongation of the moving aperture shutter.

18 Claims, 1 Drawing Sheet

APERTURE CORRECTION FOR MOVING APERTURE SHUTTERS

TECHNICAL FIELD

This invention relates to the art of shutters, and more particularly to a new and improved moving aperture shutter.

BACKGROUND OF THE INVENTION

In a basic moving aperture or flying aperture shutter two apertures of different size initially are out of registry and during a film exposing operation are brought into registry. In particular, exposure at the smaller aperture is achieved by moving that aperture into the center of the larger aperture, holding the shutter in that position briefly and then moving the smaller aperture back out of position.

A problem with this type of shutter is that a portion of the larger aperture is exposed during the time that the smaller aperture is moved into and out of the position at the center of the larger aperture. The additional exposure from the portion of the larger aperture has the effect of increasing the size of the smaller aperture in the direction of movement thereof. This, in turn, increases the photographic blur circle at the film negative in the foregoing direction.

SUMMARY OF THE INVENTION

It is a principal object of this invention to provide a new and improved moving aperture shutter.

It is a further object of this invention to provide such a shutter which minimizes the blur circle problem associated therewith.

It is a more particular object of this invention to provide such a shutter wherein the blur circle elongation is countered.

It is a more particular object of this invention to provide such a shutter which reduces the photographic blur circle at the film negative in the direction of travel of the moving aperture.

It is a further object of this invention to provide such a shutter which is relatively simple in structure so as to be convenient and economical to manufacture.

It is a further object of this invention to provide such a shutter which is efficient and effective in operation.

The present invention provides aperture correction for a moving aperture shutter comprising means for defining a first aperture, means for defining a second aperture, means for causing relative movement between the first and second aperture defining means between an initial position where the first and second apertures are out of registry, through an intermediate position where one of the apertures is partially within the other aperture and an exposure position where the one aperture is within the other aperture, and wherein the aperture correction is provided by altering a physical relationship between the first and second apertures so as to minimize the amount of exposure of the other aperture during movement through the intermediate position. The shape and/or size of the other aperture can be altered, the location of the one aperture within the other in the exposure position can be altered, or there can be a combined alteration of aperture shape, size and location. Typically the one aperture is smaller than the other aperture. As a result, the foregoing counters the blur circle elongation of the moving aperture shutter.

The foregoing and additional advantages and characterizing features of the present invention will become clearly apparent upon a reading of the ensuing detailed description together with the included drawing wherein:

DETAILED DESCRIPTION

Figure 1:
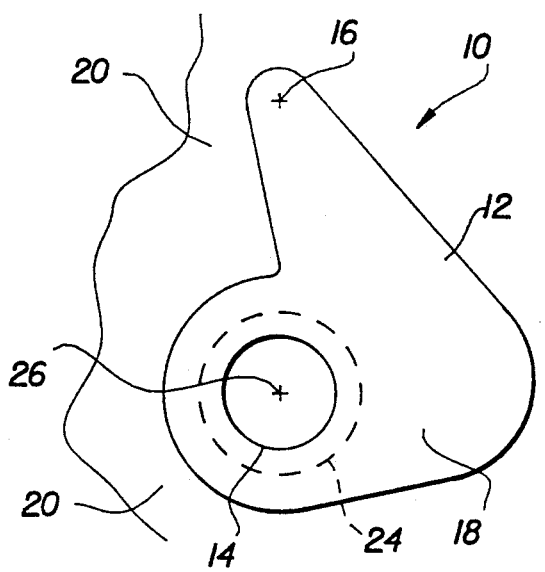
FIG. 1 is a diagrammatic view of a moving aperture shutter to which the present invention is applicable.

FIG. 1 shows a basic moving aperture shutter generally designated 10. Shutter 10 includes means in the form of blade 12 for defining a first aperture 14. In the shutter shown, blade 12 is in the form of a thin plate of metal or the like having the outline or peripheral shape as shown, and aperture 14 is defined by a circular opening provided through the blade. Blade 12 is pivotally mounted at 16 to the shutter body, a portion of which is designated 20, and is operatively connected to motive means 18 for movement about pivot 16 in a manner which will be described. Motive means 18 can be of various forms and typically is an electromagnetic driver as shown, for example, in U.S. Pat. No. 2,956,491 issued Oct. 18, 1960 the disclosure of which is hereby incorporated by reference.

Shutter 10 further comprises means for defining a second aperture 24. In the shutter shown, aperture 24 is defined by a circular opening in shutter body 20, and the second aperture 24 is larger in area than the first aperture 14. In addition, aperture 24 is fixed, being defined in the shutter housing 20, and the optical axis of shutter 10 is designated 26 in FIG. 1.

Shutter 10 is of the type in which exposure at the small aperture 14 is achieved by moving that aperture into the center of the larger aperture 24, holding in that position, then moving the aperture 14 back out of position. FIG. 1 shows shutter blade 12 in a position where the shutter is fully opened to the small aperture 14. In particular, during operation of shutter 10, motive means 18 moves blade 12 for causing relative movement between apertures 14 and 24 between an initial position where apertures 14 and 24 are out of registry in which case blade 12 would be pivoted clockwise about pivot 16 as viewed in FIG. 1, through an intermediate position as blade 12 is pivoted counter-clockwise about pivot 16 where aperture 14 is partially within aperture 24 and an exposure position as shown in FIG. 1 where aperture 14 is totally within aperture 24.

Figure 2:
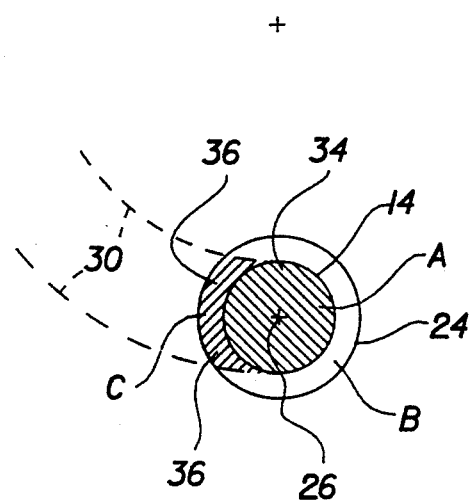
FIG. 2 is a diagrammatic view illustrating the blur circle problem with the shutter of FIG. 1.

FIG. 2 illustrates a problem with moving aperture shutters like shutter 10 which is referred to as the blur circle problem. The arc or path 30 shown in broken lines in FIG. 2 indicates the direction of movement of blade 12 (not shown in FIG. 2) during the aforesaid operation of shutter 10. The area designated by the one region of oblique lines 34 represents the smaller aperture 14 when centered in position on the optical axis 26 of the larger aperture 24. This is the exposure position referred to in the aforesaid operation of shutter 10. The area designated by the other region of oblique lines 36 represents that portion of the area of the larger aperture 24 which is exposed during movement of the small aperture 14 to and from registry with the optical axis 26. Exposure from area 36 has the effect of increasing the size of small aperture 14 in the direction of travel of aperture 14 during movement of blade 12. In camera shutters this increases the photographic blur circle at the film negative in that direction.

This blur circle problem can be reduced by eliminating as much exposure from area 36 as possible. Reducing the time spent in area 36 by faster movement of blade 12 is one solution to the problem but physics and economics limit the speed of blade 12. In accordance with the present invention, the solution of the blur circle problem is to alter a physical relationship between the first and second apertures 14 and 24, respectively, so as to minimize the amount of exposure of aperture 24 during movement of aperture 14 through the intermediate position, i.e. the position prior to the final exposure position. The shape and/or size of aperture 24 can be altered, the location of aperture 14 within aperture 24 can be altered or there can be a combined alteration of aperture shape, size and location.

Figure 3:
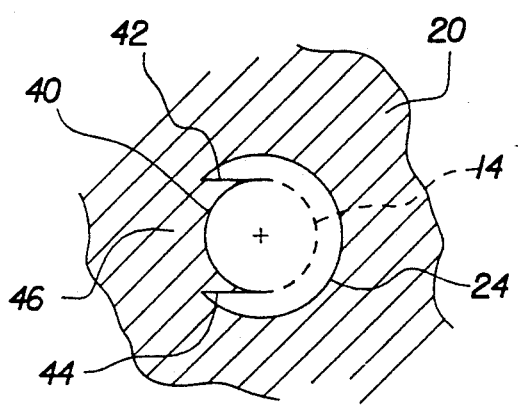
FIG. 3 is a diagrammatic view illustrating one form of the present invention altering aperture shape and size to solve the blur circle problem illustrated in FIG. 2.

In particular, FIG. 3 shows the large aperture 24 shaped or configured to block all of the aforesaid area 36. A major position of the circumference of aperture 24 is circular and of the same diameter as the original, unaltered aperture 24. The remainder of the circumference of aperture 24 includes a portion 40 which coincides with the corresponding portion of the circumference of aperture 14 when it is centered within aperture 24 in the final exposure position of FIG. 1. Portion 40 joins the main circumference of aperture 24 by chords 42,44 which are substantially mutually parallel and coincide with the aforesaid arc of blade rotation. Thus, in the embodiment of FIG. 3, aperture 24 defines a region or area 46 defined by circumferential portion 40 and chords 42,44 which blocks all light which formerly was admitted through the area 36 and formerly resulted in unwanted exposure. Thus, region 46 alters a physical relationship between apertures 14 and 24 to minimize the exposure of aperture 24 during movement of aperture 14.

Figure 4:
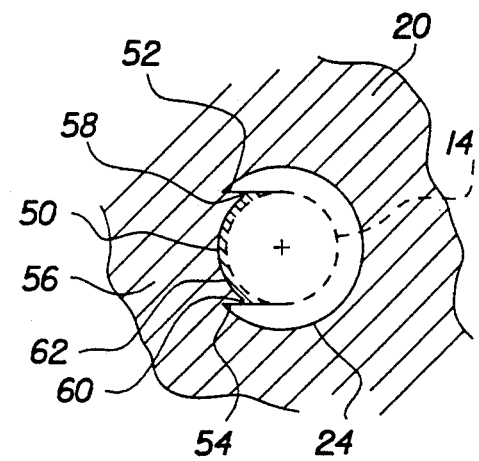
FIG. 4 is a diagrammatic view illustrating a variation in the solution shown in FIG. 3.

FIG. 4 shows the large aperture 24 shaped or configured similar to that shown in FIG. 3 but in a manner blocking part of the area 36 representing unwanted light from small aperture travel. This represents a compromise which eliminates less of the area 36 but allows more light through the large aperture 24. This circumferential portion 50 is of a diameter slightly larger than that of portion 40, chords 52 and 54 are slightly shorter than chords 42 and 44 and the region 56 defined by portion 50, chords 52,54 and lengths 58 and 60 is smaller in area than region 46 shown in FIG. 3. The shaded region 60 represents the reduced area 36 provided by this shaping or altering of aperture 24 in the embodiment of FIG. 4.

Figure 5:
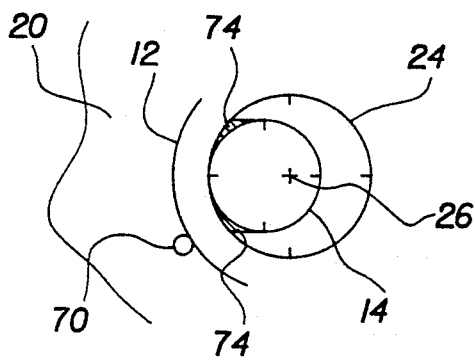
FIG. 5 is a diagrammatic view illustrating another form of the present invention altering aperture location to solve the blur circle problem illustrated in FIG. 2.
Figure 6:
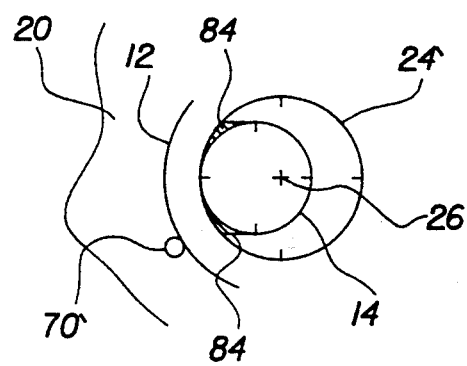
FIG. 6 is a diagrammatic view illustrating a variation in the solution shown in FIG. 5.

FIGS. 5 and 6 illustrate how aperture positioning can be used to reduce the aforesaid area 36. In particular, the location of aperture 14 within aperture 24 can be altered with the advantage that the size of the larger aperture 24 is not altered. FIG. 5 shows an arrangement where the small aperture 14 stops at the exposure position off the center of aperture 24, at a location just inside the large aperture 24 to reduce the length of travel of aperture 14 through large aperture 24. At this location, a point on the circumference of small aperture 14 is coinicident with a point on the circumference of aperture 24. The shutter optical axis 26 remains at its typical location. The foregoing is achieved by controlling the movement of blade 12 by suitable means, one of which is illustrated by the stop means designated 70 in FIG. 5 which is fixed to shutter body 20 at a location for contacting an edge of blade 12 to stop aperture 14 in the location shown in FIG. 5. The shaded area 74 in FIG. 5 represents the reduced area 36 provided by this altering of the location of aperture 14 within aperture 24.

FIG. 6 illustrates an approach wherein blade 12 is stopped as in the arrangement of FIG. 5 and in addition, the location of aperture 24 is changed relative to the shutter optical axis. This has the result of decreasing even further the aforesaid area 36 identical to that of FIG. 5. In particular, aperture 24' shown in FIG. 6 is shifted so that the center thereof no longer coincides with the shutter optical axis 26. The stop means 70' is also changed in location so that aperture 14 stops just inside aperture 24' in a manner identical to that of FIG. 5. The shaded area 84 in FIG. 6 represents the reduced area 36 provided by shifting both apertures 14 and 24 off the optical axis.

It is therefore apparent that the present invention accomplishes its intended objects. The blur circle problem associated with moving aperture shutters is reduced by altering the physical relationship between the two apertures so as to minimize the amount of exposure of one of the apertures during movement of the other aperture therethrough.

While embodiments of the present invention have been described in detail, that is done for the purpose of illustration, not limitation.

What is claimed is:

1. A moving aperture shutter, comprising
   a) means for defining a first aperture;
   b) means for defining a second aperture; and
   c) means for causing relative movement between said first and second aperture defining means between an initial position where the first and second apertures are out of registry, through an intermediate position where one of the apertures is partially within the other aperture and an exposure position where the one aperture is within the other aperture, wherein in said exposure position a portion of an edge of said one aperture is aligned with a portion of an edge of said other aperture which was first exposed by said one aperture so as to minimize the amount of exposure of the other aperture during movement through the intermediate position.

2. A shutter according to claim 1, wherein a shape and/or size of the other aperture contributes to minimizing the amount of exposure of the other aperture during movement through the intermediate position.

3. A shutter according to claim 2, wherein the shape and/or size of the other aperture blocks exposure thereof during movement of the one aperture into the exposure position.

4. A shutter according to claim 1, wherein in said exposure position the one aperture is just within the other aperture and the centers of the apertures are offset.

5. A shutter according to claim 4, wherein portions of the circumferences of said apertures coincide.

6. A shutter according to claim 4, wherein said shutter has an optical axis and wherein the center of said other aperture is offset from said optical axis.

7. A moving aperture shutter, comprising
 a) means for defining a fist aperture;
 b) means for defining a second aperture larger in area than said first aperture; and
 c) means for causing relative movement between said first and second aperture defining means between an initial position where the first and second apertures are out of registry, through an intermediate position where the first aperture is partially within the second aperture and an exposure position where the first aperture is within the second aperture, such that in said exposure position a portion of an edge of said first aperture is aligned with a portion of an edge of said second aperture which was first exposed by said first aperture so as to minimize the amount of exposure of the second aperture during movement through the intermediate position.

8. A shutter according to claim 7, wherein a shape and/or size of the second aperture contributes to minimizing the amount of exposure of the second aperture during movement through the intermediate position.

9. A shutter according to claim 8, wherein the shape and/or size of said second aperture blocks exposure thereof during movement of said first aperture into the exposure position.

10. A shutter according to claim 7, wherein in said exposure position said first aperture is just within said second aperture and the center of said apertures are offset.

11. A shutter according to claim 10, wherein portions of the circumference of said apertures coincide.

12. A shutter according to claim 10, wherein said shutter has an optical axis and wherein the center of said second aperture is offset from said optical axis.

13. An aperture correction method for a moving aperture shutter including first and second apertures wherein the second aperture is larger in area than the first aperture, said method comprising the step of:
 causing relative movement between said first and second aperture between an initial position where the first and second apertures are out of registry, through an intermediate position where the first aperture is partially within the second aperture and an exposure position where the first aperture is within the second aperture, such that in said exposure position a portion of an edge of said first aperture is aligned with a portion of an edge of said second aperture which was first exposed by said first aperture so as to minimize the amount of exposure of the second aperture during movement through the intermediate position.

14. A method according to claim 13, wherein a shape and/or size of the second aperture contributes to minimizing the amount of exposure of the second aperture during movement through the intermediate position.

15. A method according to claim 14, wherein said second aperture is shaped and sized to block exposure thereof during movement of said first aperture into the exposure position.

16. A method according to claim 13, wherein in the exposure position said first aperture is just within said second aperture and the centers of said apertures are offset.

17. A method according to claim 16, wherein portions of the circumferences of said apertures coincide.

18. A method according to claim 16, wherein said shutter has an optical axis and wherein the center of said second aperture is offset from said optical axis.

* * * * *